United States Patent

Trimble

[15] 3,671,939

[45] June 20, 1972

[54] PER-CYCLE BASIS FREQUENCY SIGNAL RECEIVER

[72] Inventor: David Carlaw Trimble, Holmdel, N.J.

[73] Assignee: Bell Telephone Laboratories, Incorporated, Murray Hill, Berkeley Heights, N.J.

[22] Filed: Oct. 15, 1970

[21] Appl. No.: 81,005

[52] U.S. Cl. ..........340/171, 340/167

[51] Int. Cl. ..........H04q 1/44

[58] Field of Search ..........340/167, 171

[56] References Cited

UNITED STATES PATENTS

| | | | |
|---|---|---|---|
| 3,175,158 | 3/1965 | Flesher | 328/138 X |
| 3,187,202 | 6/1965 | Case | 328/138 X |
| 3,187,234 | 6/1965 | Muranaka | 340/171 X |
| 3,305,732 | 2/1967 | Grossman | 328/138 X |
| 3,319,225 | 5/1967 | Anderson | 340/167 |
| 3,539,827 | 11/1970 | Crowe | 328/138 X |

*Primary Examiner*—Harold I. Pitts
*Attorney*—R. J. Guenther and Edwin B. Cave

[57] ABSTRACT

In a communication system, signal tones are detected with protection against the false recognition of spurious tones by an arrangement that includes the combination of a per-cycle switch and a time delay circuit. Presence of signal tone continuously throughout each cycle or group of cycles is required rather than the conventional test for an "on-the-average" presence of tone throughout a given period.

7 Claims, 13 Drawing Figures

INVENTOR
D. C. TRIMBLE
BY E. J. Olinder
ATTORNEY

PER-CYCLE BASIS FREQUENCY SIGNAL RECEIVER

BACKGROUND OF THE INVENTION

1. Field of the Invention

This invention relates to communication signaling systems and, more particularly, to signal receivers including tone detectors.

2. Description of the Prior Art

In the field of telephony, signal receivers employing tone detectors are often of the multifrequency type requiring apparatus capable of responding only to coincident signal bursts of diverse frequencies. U.S. Pat. No. 3,281,790 issued to L. C. J. Roscoe, Oct. 25, 1966, is illustrative of such a system. In prior art receivers, such as that disclosed by Roscoe, various circuit combinations are employed to test the validity of incoming combinations of coincident two-tone bursts in order to ensure that direct current output signals are generated only in response to valid input signals. For example, a timer action is provided to ensure a timing-out period that requires the presence of a valid signal of at least some average value for some preselected time interval.

Insofar as the future signaling needs of individual telephone subsets are concerned, the current trend of interest in communications signal receivers is toward single frequency receivers as opposed to multifrequency receivers. This trend has resulted largely from the potential for miniaturization provided by integrated circuits which has made feasible a wide variety of single frequency signal applications, including, for example, inband ringing and A-C subscriber loop supervision as well as remote testing of loops and sets. Additionally, single frequency signaling equipment is generally less complex than multifrequency equipment. For single frequency systems illustrative of the prior art, see for example the paper entitled "In-Band Single-Frequency Signaling" published in the Bell System Technical Journal by A. Weaver and N. A. Newell, Nov. 1954, pp. 1,309–1,330. Although some of the apparatus and techniques of multifrequency signal receivers are applicable to single frequency signal equipment, there are certain aspects of single frequency signaling that require a somewhat different approach, particularly if tone detectors are to be incorporated in subsets. There is, for example, a fundamental requirement for simplicity. Additionally, although the likelihood of interference from spurious signals is greater in single frequency than in multifrequency systems, the need for detection reliability is at least equal.

Accordingly, a general object of the invention is to enhance the reliability of single frequency receivers without an increase in complexity.

SUMMARY OF THE INVENTION

The foregoing object and additional objects are achieved in part, in accordance with the principles of the invention, by the utilization of a unique time delay network which prevents short, narrowband speech or noise bursts from causing false operation of the detector. A significant feature of the detector is a requirement imposed on the time delay network that a signal to be accepted as valid must be present substantially continuously, except for very brief breakups caused by noise spikes, for example, during each signal cycle that occurs during some preselected time period. This arrangement is a considerably more stringent validity test than the conventional type that requires that only the time-average output of a received signal exceed an established threshold.

In accordance with another feature of the invention, the time delay unit makes use of a differential charging circuit which ensures an exceptionally fast reset in the event of an unacceptable gap or break in the incoming signal. This action ensures against any buildup of the charge stored in the timing capacitor as a result of successive spurious signals.

A number of additional aspects and features contribute to the overall effectiveness and reliability of a signal receiver constructed in accordance with the principles of the invention. For example, the primary receiver units which process an incoming signal prior to the operation of the time delay network discussed above include a limiter, a bandpass amplifier and a threshold detector. Accurate temperature compensation of the receiver as a whole is achieved by an approach to the problem that in effect cancels out the normally expected base-emitter voltage dependence found in many simple limiters and level detectors.

A feature of the bandpass amplifier, which employs a twin-tee network in the feedback path, is that the input is on the shunt resistor leg of the twin-tee. This arrangement has the advantage of isolating the input from the amplifier D-C bias and of providing a means of readily adjusting the input attenuation for maximum amplifier output in the linear range.

DETAILED DESCRIPTION

SYSTEM DESCRIPTION

Figure 1:
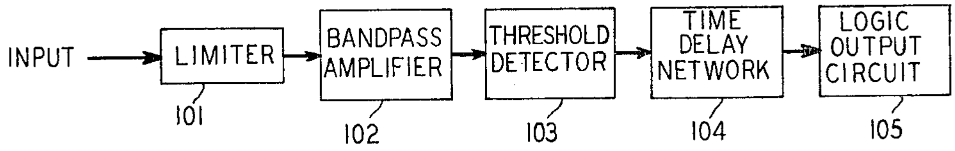
FIG. 1 is a block diagram of a single frequency signal receiver in accordance with the invention.
Figure 2:
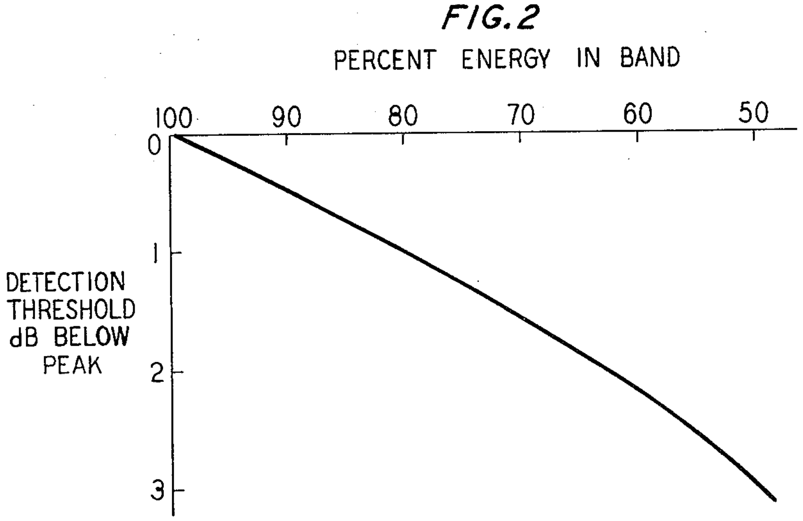
FIG. 2 is a plot of the energy discrimination characteristics of the limiter shown in FIG. 1.

The single frequency voiceband signaling system in accordance with the invention shown in FIG. 1 consists of a tandem combination of a limiter 101, a bandpass amplifier 102, a threshold detector 103, a time delay network 104 and a logic output circuit 105. The limiter 101 performs two primary functions, namely the function of an energy discriminator and, additionally, a function analogous to that performed by an automatic gain control (AGC) circuit. Energy discrimination is provided in that the effective level of the desired signal at the output of the amplifier 102 is reduced as the fraction of out-of-band energy is increased. This relationship is illustrated by FIG. 2. The AGC-like function stems from an arrangement whereby the limiter 101 provides an input level to the bandpass amplifier 102 which is independent of the limiter input level and, hence, transmission loss. The bandpass amplifier 102 and the threshold detector 103 provide frequency discrimination and, as a result of the energy discriminating action provided by the limiter, ensure that the inband energy exceeds some fraction of the total energy available from the limiter.

Figure 13:
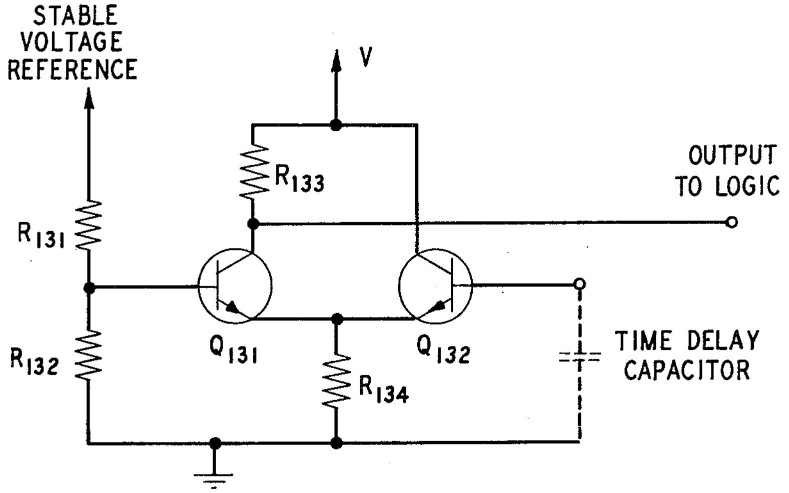
FIG. 13 is a simplified schematic circuit diagram of the level detector in the logic output circuit of FIG. 1.

The time delay network 104 is required, in accordance with the invention, to prevent short, narrowband speech or noise bursts from causing false operation of the detector. A low noise environment is turned to account by imposing upon the time delay network 104 a requirement that an input signal to be recognized as valid must be present continuously rather than "on-the-average" during the time delay interval. Stated otherwise, during each cycle of the bandpass amplifier output, the threshold of the level detector of FIG. 13 must be exceeded for a specified fraction of the cycle rather than requiring only that, on-the-average, each cycle of output exceeds that threshold. Although not specifically shown in FIG. 1, the level detector of FIG. 13 is a part of the logic output circuit 105 of FIG. 1.

TEMPERATURE COMPENSATION

Figure 3:
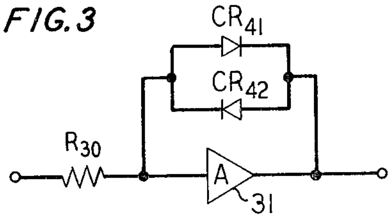
FIG. 3 is a block-schematic diagram of the limiter of FIG. 1.
Figure 4:
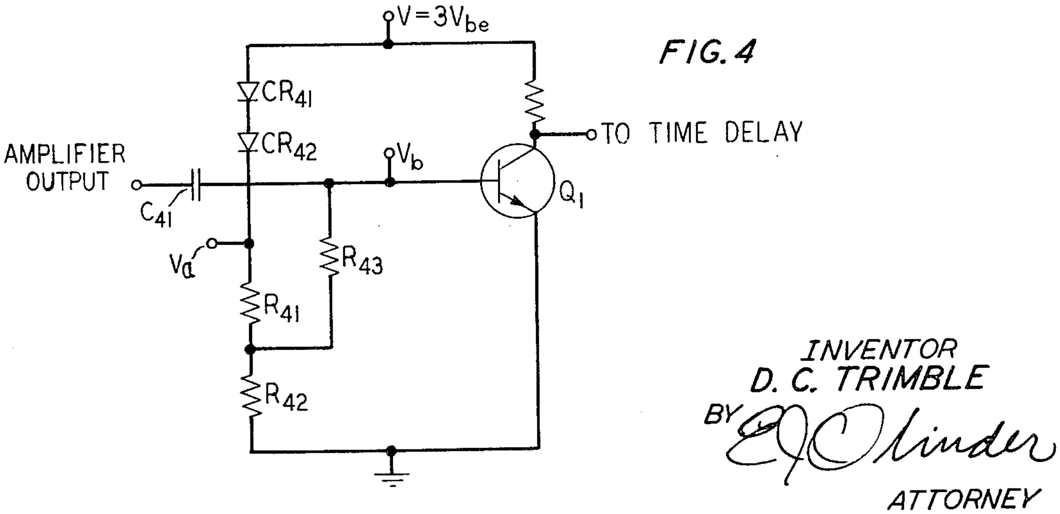
FIG. 4 is a schematic circuit diagram of the threshold detector of FIG. 1.

Insofar as temperature compensation is concerned, the principles of the invention exploit the fact that basic limiter circuits, level detectors and power supplies are commonly $V_{be}$ dependent, which is to say that the characteristics of these units are determined in part by the base-emitter voltages of the solid-state elements, particularly when integrated solid-state circuits are employed. First, it is assumed that the output of the limiter 101 varies directly as $V_{be}$ with temperature. A block-schematic representation of such a limiter is shown in FIG. 3. The limiter is illustrated symbolically as an amplifier 31 having its input applied by way of a resistor $R_{30}$ and having a feedback path including the two limiting diodes $CR_{32}$ and $CR_{33}$. The bandpass amplifier 102 is assumed to have a sufficiently high return ratio so that its gain characteristic is independent of temperature. Accordingly, temperature variation of the limiter-bandpass amplifier output level ($V_0$) is proportional to $V_{be}$, that is, $$V_0 = K\, V_{be}, \qquad (1)$$

where $K$ is the amplifier gain. An illustrative schematic diagram for the threshold detector 103 is shown in FIG. 4. In the circuit of FIG. 4, transistor $Q_1$, is normally off since $$V_a = V_{be}. \qquad (2)$$

Where resistor $R_{43}$ is large compared to the magnitudes of resistors $R_{41}$ and $R_{42}$, the voltage $V_b$, using equations (1) and (2), may be expressed as follows:

$$V_b = K\, V_{be} + [R_{42}/(R_{41}+R_{42})]\, V_{be}. \qquad (3)$$

Accordingly, transistor $Q_1$ starts to turn on when $$V_b = V_{be}. \qquad (4)$$

Combining equations (3) and (4) it may be seen that the threshold established by the circuit of FIG. 4 can be much smaller than $V_{be}$ and yet, when used in conjunction with a limiter whose output varies with $V_{be}$, the result is independent of $V_{be}$.

Figure 5:
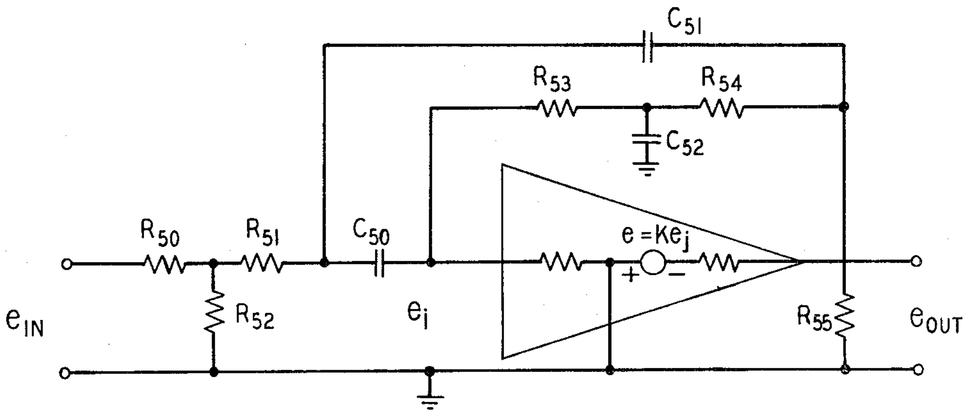
FIG. 5 is a schematic circuit diagram of the bandpass amplifier of FIG. 1.

The particular circuit configuration employed in one embodiment of the invention for the bandpass amplifier 102 is shown in FIG. 5. One feature of that circuit is that the input $e_{in}$ is applied across the shunt resistor leg $R_{52}$ on the twin-tee feedback network which further includes resistors $R_{50}$, $R_{51}$, $R_{52}$, $R_{53}$ and $R_{54}$ and the capacitors $C_{50}$, $C_{51}$ and $C_{52}$. This arrangement has the advantage of isolating the output from the amplifier D-C bias and for providing a means for adjusting the input attenuation for the maximum output in the linear range. An unbalanced twin-tee is used to improve performance with the noninfinite amplifier input impedance offered to the twin-tee.

TEMPERATURE COEFFICIENT EFFECTS ON BANDPASS DESIGN

Figure 6:
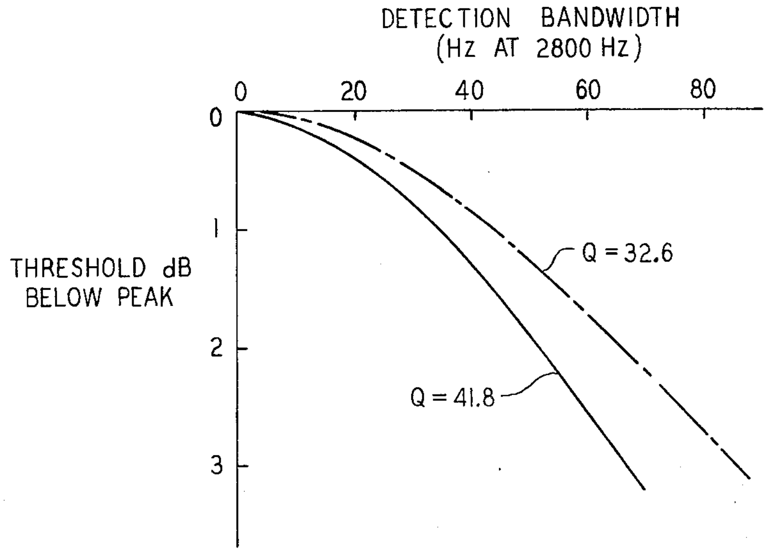
FIG. 6 is a plot of the relation between threshold and detection bandwidth for the receiver of FIG. 1.

Assuming a sufficiently high return ratio for the amplifier (or, equivalently, a high open loop gain), the amplifier characteristic can be considered to be controlled by the feedback network. An examination of tantalum temperature coefficient effects on the bandpass amplifier response will serve to illustrate the design principles involved. The point of primary interest is not the variation in the bandpass amplifier characteristic that occurs with temperature, but instead is the effect of such variation on the system response. Accordingly, the criterion of interest is the variation in the detection bandwidth which is defined as the total signal bandwidth in Hertz for which the amplifier gain exceeds the detection threshold. The detection bandwidth is a function of the Q of the amplifier where Q is defined as the center frequency divided by the difference in the two 3 db frequencies. The detection window for a 2,800 Hz center frequency is shown in FIG. 6 for two values of Q. These Q's are representative of the range of interest for this design. The detection bandwidth is a function of temperature only to the extent that the Q changes. Thus, the detection bandwidth can be considered as the width of available spectrum window, the width and center of which may change as a function of temperature.

Figure 7:
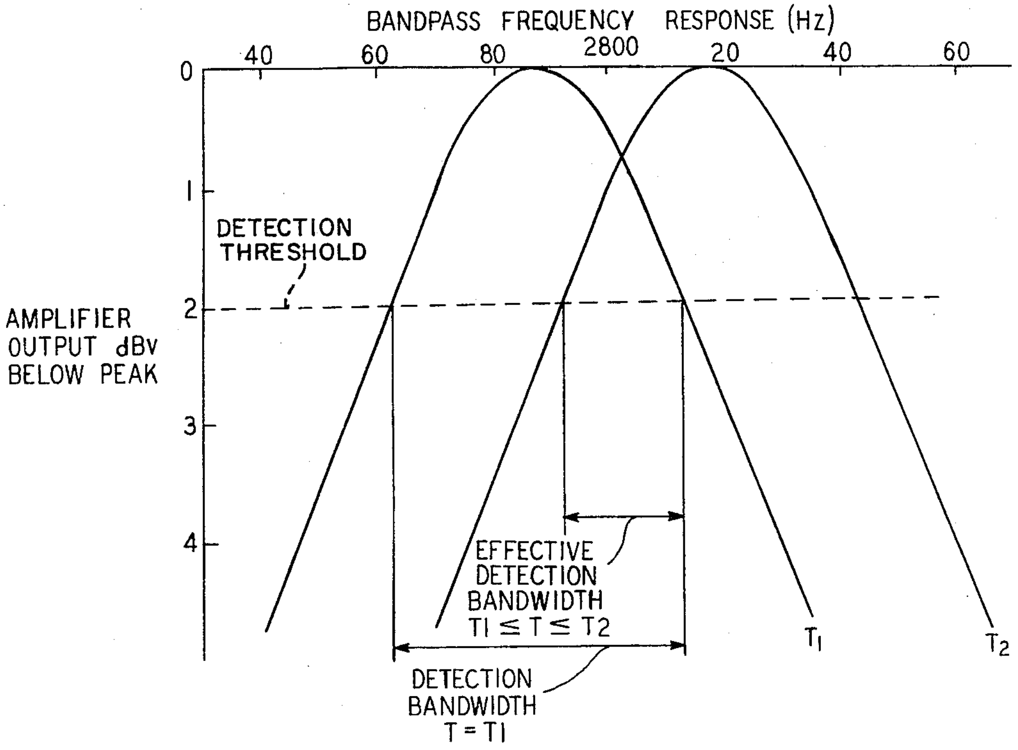
FIG. 7 is a plot of bandpass frequency response versus amplifier output.

The effective detection bandwidth is defined as that bandwidth which is always available even though the actual frequency response varies from nominal as a result of shifts in center frequency and in Q. This relation is illustrated in FIG. 7.

Figure 8:
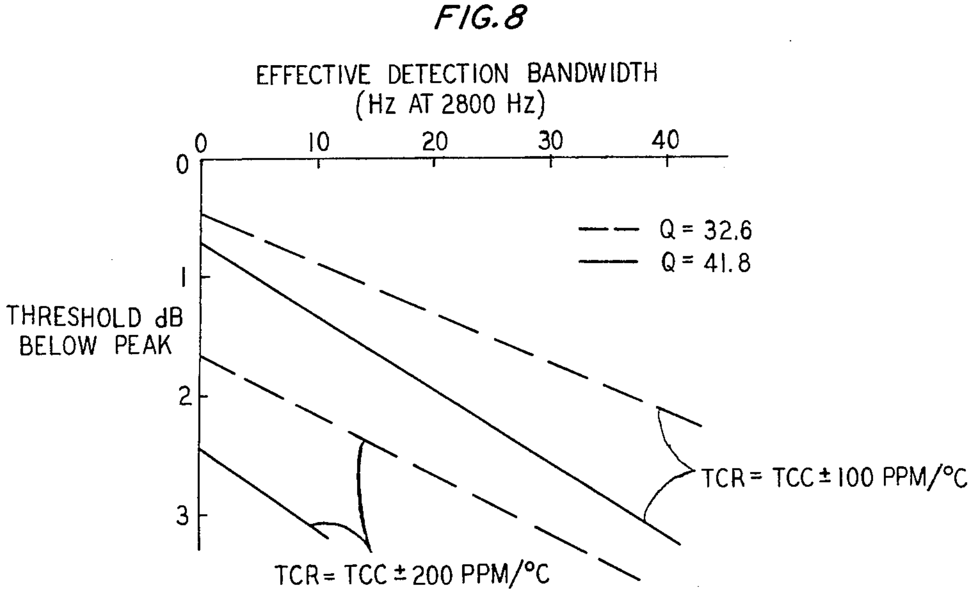
FIG. 8 is a plot showing the effects of temperature coefficient and Q on detection bandwidth.

The effective detection bandwidth for Q's of 32.6 and 41.7, for the case where the temperature coefficient of capacitance is +200ppm/° C, a typical temperature coefficient for tantalum capacitors, and for various temperature coefficients of resistance is shown in FIG. 8. The two temperature extremes assumed for these curves are −40° and +65° C. For the values of Q used, the amplifier peak output was found to change less than 0.1 db with temperature for all cases investigated.

Figure 9:
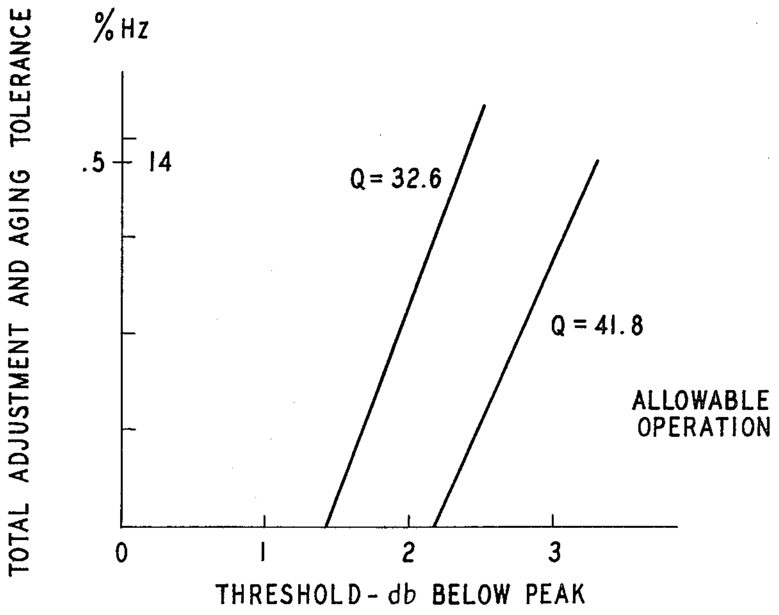
FIG. 9 is a plot illustrating the operating region for a receiver in accordance with the invention.

The detection bandwidth curves of FIG. 8 can be used in conjunction with a knowledge of the transmitted signal tolerance, carrier-induced frequency shift, initial adjustment and aging tolerances for the amplifier and threshold detector setting to determine the allowable range of Q. For example, for a signal tolerance of ±¼ percent, or ±7 Hz about 2,800 Hz, a carrier-induced frequency shift of ±5 Hz, allowable adjustment and aging tolerance as a function of threshold for various Q's and $TCR = -100$ or $-300$ ppm is shown in FIG. 9.

TIME DELAY CIRCUITRY

In accordance with the invention, the time delay network 104 of FIG. 1 consists of two primary elements, namely, a per-cycle switch operated by the threshold detector 103 and a time delay circuit with variable holdover time. As indicated above, the generation of an output indicating the presence of a valid input signal requires that during each cycle of the input signal and for some preselected period of time, a threshold level must be exceeded to operate a per-cycle switch. The switch is adjusted so that an output from the logic output circuit 105 is on continually if each successive cycle of the input exceeds the threshold level. For the simplified circuit realization shown in FIG. 10, assuming that the capacitor $C_P$ is large enough to hold over for a complete period, the minimum size can be approximated as follows:

$$C = \frac{1}{f_{\min}\, \mathrm{Reg}\, \ln(2)} \qquad (5)$$

where $$\mathrm{Req} = \frac{R_b R_p}{R_b + R_p}$$

and $f_{min}$ is the frequency at the lower edge of the effective detection bandwidth. Equation (5) is derived for a linearized form of FIG. 10 with the lower end of the resistor $R_b$ connected to common. Since the actual current through resistor $R_b$ is slightly less than assumed in the linearized circuit form, the actual minimum value of $C$ is slightly less than that predicted for equation (5).

Figure 10:
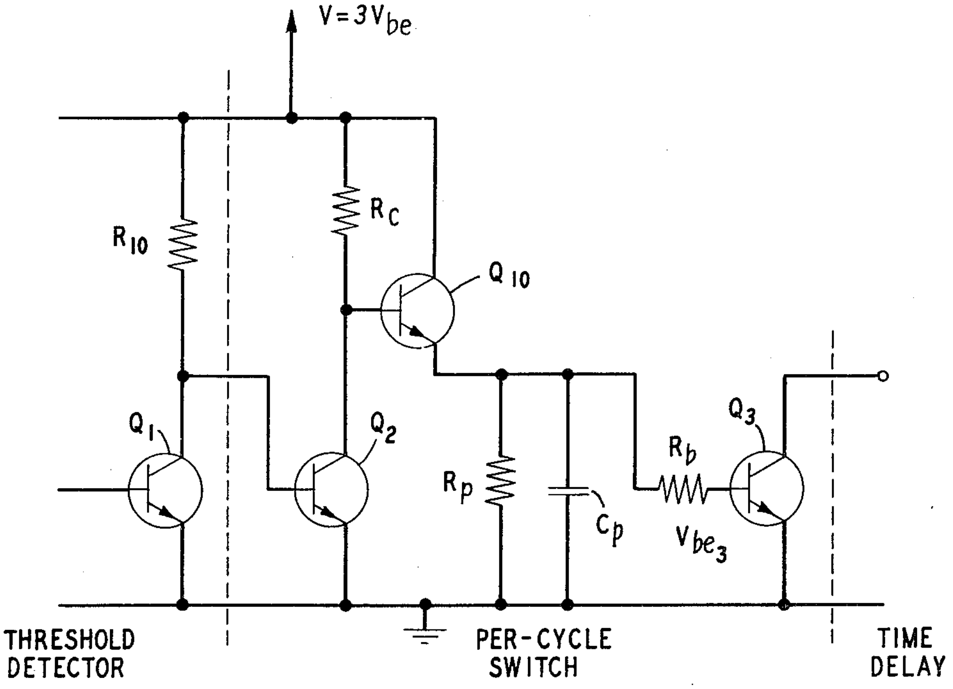
FIG. 10 is a simplified schematic circuit diagram of a per-cycle switch in accordance with the invention.

In FIG. 10 transistor $Q_1$ is a threshold device which is a part of the threshold detector 103, and transistor $Q_2$ is a phase inverter switch. The resistors $R_{10}$ and $R_c$ are load resistors. The purpose of transistor $Q_{10}$ is to facilitate the rapid charging of capacitor $C_p$. Other elements in the per-cycle switch include the RC circuit $R_p$–$C_p$ together with a resistor $R_b$ and a transistor switch $Q_3$. The discharge path is through resistors $R_p$ and $R_b$ with the principal discharge path being through resistor $R_p$. This arrangement ensures that capacitor $C_p$ can be charged and discharged essentially independent of $Q_3$.

With a sinusoidal input it is evident that transistor $Q_2$ in FIG. 10 is never on for more than half the time and, accordingly, the use of capacitor $C_p$ as indicated by equation (5) ensures against holdover for more than one cycle. Holdover for more than one cycle may be desirable however in a particular noise environment, and this change can be achieved by increasing the magnitude of capacitor $C_p$ as appropriate. In other cases, holdover may become a function of incoming pulse width (or threshold setting). This relation can be overcome by the addition of a one-shot multivibrator between the threshold detector 103 and the per-cycle switch.

VARIABLE HOLDOVER TIME DELAY

Figure 11:
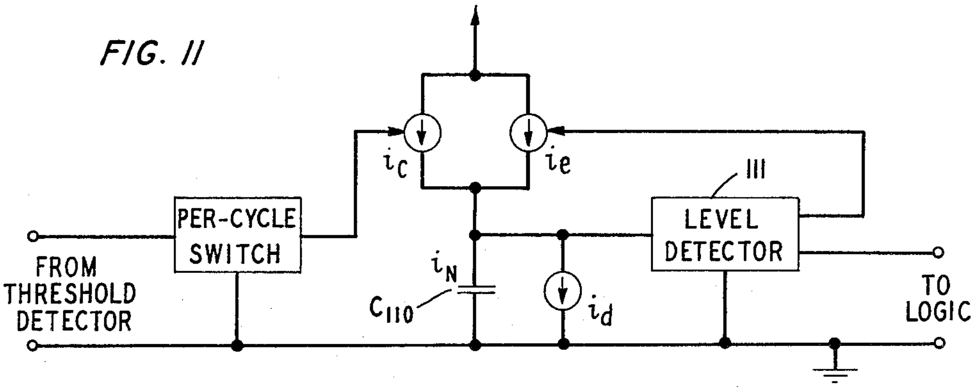
FIG. 11 is a block-schematic diagram of a time delay network in accordance with the invention.

The time delay unit described herein makes use of a differential charging circuit of the type illustrated in FIG. 11 where the difference between two current sources $i_c$ and $i_d$ is used to charge a capacitor $C_{110}$ linearly until the voltage across the capacitor exceeds some threshold, thereby operating a level detector 111 which is, in fact, a part of the logic output circuitry 105 of FIG. 1. The current $i_c$ is on whenever the per-cycle switch is on, and otherwise $i_c$ is off. The current $i_e$ is on when the capacitor $C_{110}$ is charged above the level detector threshold and is otherwise off. The current $i_d$ is constant.

Figure 12:
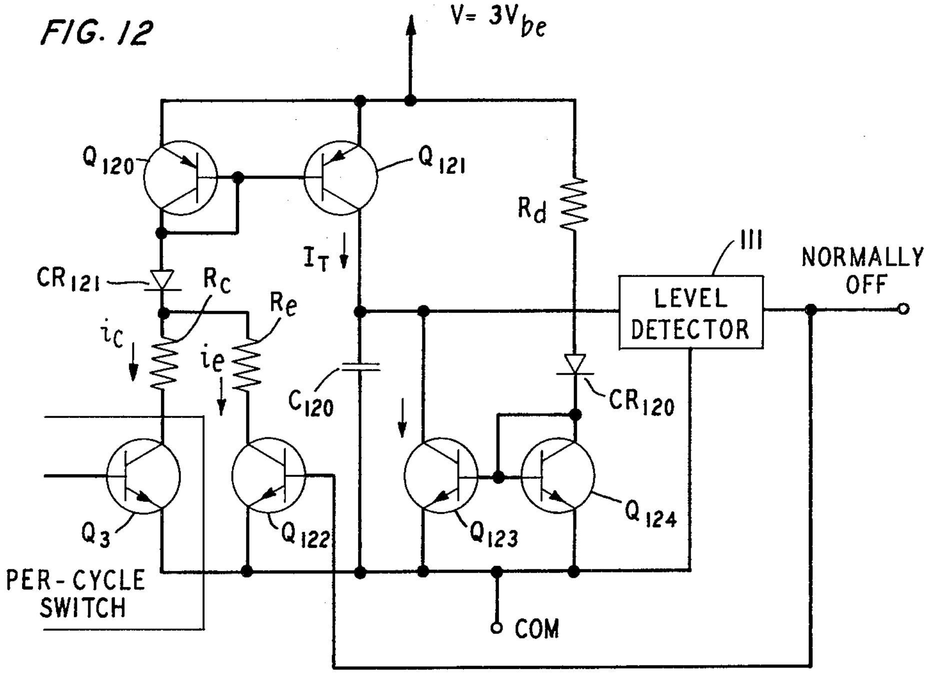
FIG. 12 is a detailed version of the circuit shown in FIG. 11.

The circuit of FIG. 11 is shown in a more detailed and somewhat modified form in FIG. 12. In the circuit of FIG. 12, a resistor $R_c$ controls the charge current $i_c$, a resistor $R_e$ controls the charge current $i_e$ and a resistor $R_d$ controls the discharge current $i_d$. Transistors $Q_{120}$ and $Q_{124}$, both operated as diodes, are employed to set the value of $V_{be}$, while transistors $Q_{121}$ and $Q_{123}$ are used to control current level. Diodes $CR_{120}$ and $CR_{121}$ provide desired voltage drops. As indicated, the current $i_d$ conducted by transistor $Q_{121}$ is equal to the sum of $i_c$ and $i_e$. The current $i_e$ exists only if the threshold is exceeded and there is feedback from the level detector to provide the holdover feature. A number of advantages are realized by the utilization of the differential current source charging scheme illustrated generally in FIG. 11 and specifically in FIG. 12. These changes include the following:

a. longer time delays for a given capacitor size;
b. reduced dependence on power supply voltage variations;
c. improved tone detector noise immunity;
d. time delay stability independent of length of delay;
e. latch and hysteresis control independent of capacitor charging rate; and
f. low temperature dependence.

The time delay, $t_d$, realized in a circuit in accordance with the invention may be expressed as follows:

$$t_d = (V_{th}C/\delta i), \qquad (6)$$

where:

$V_{th}$ = voltage threshold of the level detector,
$C$ = capacitance,
$\delta i = i_c - i_d$, the difference between charge and discharge currents.

It is thus evident that the time delay $t_d$ can easily be made quite large by decreasing $\delta i$. Inspection of equation (6) also makes it evident that $t_d$ can be made independent of power supply voltage and temperature, neglecting capacitor variation, by matching the variations in $V_{th}$ and $\delta i$.

In accordance with the invention, the differential charging scheme allows quick capacitor discharge when the charging current is turned off and the capacitor voltage is below threshold. For instance, if $$\delta i = i_c - i_d = i_d/10, \qquad (7)$$

then the discharge rate is ten times the charging rate. This quick discharge results in a substantial improvement in immunity to noise by preventing slow charge buildup on the timing capacitor which might otherwise occur, owing to frequent, short, inband tone bursts caused by speech or other spurious sources. Such charge buildup, if not guarded against, could cause spurious detection.

In accordance with the invention, by adding a second charging current source, one controlled by the level detector 111, the circuit can be made to latch up. The proper choice of $i_e$ compared to $i_c$ and $i_d$ allows the holdover time to be determined when the level detector impedance and level hysteresis are taken into account. For proper operation, $i_c$, $i_d$ and $i_e$ must satisfy the following inequality:

$$i_c > i_d > i_e. \qquad (8)$$

It is possible to examine the variation of the net charging current as a function of device parameters and temperature. From such an examination it can be shown that for high quality monolithic transistors, the small temperature variation of the net charging current is equal to the temperature variation of the charge (or discharge) current multiplied by the ratio of the net charging current to the charge (or discharge) current.

LEVEL DETECTOR

Because the temperature variation of the voltage across the timing capacitor and the variation of $\delta i$ may be made small, the temperature variation in time delay may be almost entirely the result of variation in the level detector threshold. The actual level detector design depends on the power supply variation. FIG. 13 is a simple form of differential level detector which can be employed with a resistance voltage divider to set the threshold with any suitable voltage reference having a low temperature dependence. The generation of temperature compensated voltage references is well known in the art, and various common techniques may be employed for that purpose.

It is to be understood that the embodiment described herein is merely illustrative of the principles of the invention. Various modifications thereto may be effected by persons skilled in the art without departing from the spirit and scope of the invention.

What is claimed is:

1. A signal receiver for producing an output signal in response to a valid oscillatory input signal comprising, in combination, a limiter circuit, a bandpass amplifier, a threshold detector, a time delay circuit and an output circuit connected in tandem relation, said time delay circuit including means responsive to an output signal from said threshold detector exceeding a preselected threshold for a preselected substantially continuous duration, said last named means including means responsive only to said last named signals present for substantially each signal cycle occuring during said substantially continuous duration, said means responsive to an output signal comprising a timing capacitor and means for charging said capacitor linearly with time in response to said last named signal and means for discharging said capacitor at a rate substantially greater than the charging rate thereof in response to a break in said last named signal, thereby precluding the building up of a charge on said capacitor in response to a succession of short spurious input signals.

2. In a single frequency signal receiver, a time delay circuit for ensuring signal validity by requiring an input signal of continuous duration throughout each signal cycle over a preselected period, said circuit comprising a per-cycle switch responsive to the output from a threshold detector, a first current source controlled by said switch, a timing capacitor, a second current source, a level detector, means connecting one side of said timing capacitor to said level detector, a feedback path connecting said level detector to said second current source, whereby said second current source produces an output only when said capacitor is charged above the threshold of said level detector, and means for applying the difference between said current sources to said capacitor.

3. Apparatus in accordance with claim 2 wherein said capacitor is shunted by rapid discharge means.

4. Apparatus in accordance with claim 3 wherein said rapid discharge means comprises the collector-emitter path of a transistor, said last named transistor operating as a current sink to provide a low impedance rapid discharge path for said capacitor under conditions when said capacitor is not being charged and when the voltage of said capacitor is below the threshold of said level detector.

5. In a single frequency signal receiver, a time delay circuit for ensuring signal validity by requiring input signal duration throughout each signal cycle over a preselected period, said circuit comprising a per-cycle transistor switch responsive to the output from a threshold detector, a level detector circuit, a timing capacitor having one terminal thereof connected to the input of said level detector circuit, a first current source controlled by said switch, a second current source controlled by a feedback path from the output of said level detector, and means for applying the difference between said first and second current sources to charge said capacitor.

6. Apparatus in accordance with claim 5 including means responsive to preselected conditions for discharging said capacitor at a rate that exceeds the net charging rate thereof by at least an order of magnitude.

7. Apparatus in accordance with claim 6 wherein said discharging means comprises a transistor having the emitter-collector path thereof connected across said capacitor.

* * * * *